United States Patent [19]

Seaver

[11] 4,112,597
[45] Sep. 12, 1978

[54] APPARATUS FOR ENABLING THE MOTION OF A SCRIBER TO BE REPRODUCED

[76] Inventor: William H. Seaver, P. O. Box 86, New London, N.C. 28127

[21] Appl. No.: 797,407

[22] Filed: May 16, 1977

[51] Int. Cl.² .................................................. G09B 11/00
[52] U.S. Cl. ............................................ 35/36; 178/19
[58] Field of Search .................... 35/36, 37, 9 E, 9 F; 178/18, 19

[56] References Cited

U.S. PATENT DOCUMENTS

| | | | |
|---|---|---|---|
| 2,241,544 | 5/1941 | Dreyer | 178/19 |
| 2,338,949 | 1/1944 | Kupfmuller et al. | 178/19 |
| 2,527,835 | 10/1950 | Miller | 178/19 |
| 2,565,612 | 8/1951 | Levin | 178/19 |
| 3,162,959 | 12/1964 | Woolman | 35/9 E |
| 3,425,140 | 2/1969 | Dillon et al. | 35/36 |
| 3,535,447 | 10/1970 | Woolrich | 178/19 |
| 3,680,224 | 8/1972 | Hall | 35/9 E |
| 3,761,877 | 9/1973 | Fernald | 178/19 X |
| 3,838,211 | 9/1974 | Joannou | 35/36 X |

Primary Examiner—William H. Grieb
Attorney, Agent, or Firm—Lowe, King, Price & Becker

[57] ABSTRACT

Apparatus to teach students to write includes a housing having a generally horizontally disposed, dielectric, translucent plate having a flat face over which a scribe can be moved and which receives a sheet of translucent, tracing paper. The same housing derives control signals in response to an instructor moving a metal scriber across the face or as an output device for visually reproducing the scriber movement. To derive control signals for X and Y axes movement of the scriber, orthogonally positioned antennas couple orthogonal electromagnetic fields having differing frequencies to the plate. The characteristics of the electromagnetic fields are changed in response to movement of the scriber within those fields, hence the signal received by a receiver for each of the frequencies depends on the scriber movement. The detected variations in signals received by the receivers are fed to a multi-track magnetic tape recorder for future playback. In playback, the tape recorder signals that control movement of a point source of light that is projected onto the plate to visually reproduce the scriber movement. To provide persistence of vision and enable a student to trace a pattern corresponding to the movement of the light source, the plate includes phosphors having a decay time of about 1 or 2 seconds.

10 Claims, 3 Drawing Figures

APPARATUS FOR ENABLING THE MOTION OF A SCRIBER TO BE REPRODUCED

FIELD OF THE INVENTION

The present invention relates generally to apparatus for enabling the motion of a scriber to be reproduced, and more particularly to such an apparatus wherein a scriber perturbs characteristics of electromagnetic fields exciting the area around and about a surface over which the scriber is moved.

BACKGROUND OF THE INVENTION

Many students, when learning to write, have difficulties in proper formation of alpha-numeric and other similar types of characters. For example, many students do not know where to start a particular character or what stroke in a character should follow a previous stroke, while other students reverse the formation of letters such as "*b*", "*s*" and "*p*". It is frequently difficult for a teacher to observe the writing habits of multiple students closely enough to realize when the students are making errors of this nature.

I have found that teaching the satisfactory formation of characters can be obtained if the student follows a light beam that moves in accordance with the formation of the character in the desired manner. By projecting the moving light beam through a translucent sheet of paper, the student learns proper character formation by tracing the beam movement on the sheet of paper with a pencil.

It is, accordingly, an object of the present invention to provide a new and improved device for enabling students to learn the formation of alpha-numeric and other similar types of characters.

Another object of the invention is to provide a new and improved apparatus for enabling the motion of an instructor's scriber to be reproduced with a visible, moving light spot at a student station so that the student can learn the desired formation of alpha-numeric and other similar characters.

It is realized that there have been developed numerous devices which are adapted to reproduce the movement of a stylus or scriber at a location remote from the location where the scriber is utilized. However, these devices have, in general, been relatively expensive and not usually particularly adapted for educational purposes. Generally, the prior art devices have been complex and have required entirely separate types of input and output devices; one type of device has generally been referred to as a telautograph apparatus. The telautograph devices are not particularly adapted for educational purposes because they form a permanent or semi-permanent image of the reproduced stylus movement. For pedagogical purposes for the formation of alpha-numeric and other similar types of characters, it is desirable to have the image or part thereof appear to move and not be permanent. A further disadvantage of many of the prior art telautograph devices is that they require a writing stylus to include special structure. For example, in Wollrich, U.S. Pat. No. 3,535,447, a pen with an oscillator coil is translated over a surface including a multiplicity of receiver coils. Of course, the use of a special pen with an oscillator has several disadvantages, such as cost and general non-availability.

It is, therefore, a further object of the invention to provide a new and improved device for enabling the motion of generally available scribers, such as a ball point pen, to be reproduced.

Yet another object of the invention is to provide a new and improved device for teaching the formation of alpha-numeric and other similar characters with a device that includes a controllable moving light source that enables a student to trace the path of the light source on a translucent sheet of paper positioned on the teaching device.

Another object of the invention is to provide a new and improved apparatus for teaching students to form letters, wherein the same apparatus can be used as an input device for a teacher to derive control signals and as an output device for providing a visual reproduction of the scriber movement in response to the control signals.

BRIEF DESCRIPTION OF THE INVENTION

In accordance with one aspect of the invention, the motion of a scriber is reproduced by providing a body having a writing surface on which the scriber is adapted to be moved. Electric radiator means coupled to the body is responsive to a transmitter means, and receiver means respond to waves transmitted by the radiator means. The scriber is formed of a material that perturbs a characteristic of the waves received by the receiver means as a function of the position of the scriber. The radiator means excites the transmitter means so that there is a unique relationship between each position of the scriber on the writing surface and the value of the characteristic received by the receiver means.

In a preferred embodiment, the transmitter and radiator means establish first and second orthogonally oriented electromagnetic fields respectively having first and second frequencies. The fields of the first and second frequencies respectively have configurations such that the values of the characteristics of the first and second fields respectively vary as a function of a scriber position relative to first and second mutually othogonal axes of the surface.

Preferably, the radiator means establishes a pair of electromagnetic fields in response to excitation by a pair of transmitting circuits that emit the first and second frequencies. The scriber has a metal tip, such as is included on common ball point pens, that is inductively coupled to the radiator means as it is moved across the writing surface to vary the signal generating characteristics of the transmitting circuit and thereby changes the characteristics of the waves transmitted from the transmitter means in their respective fields of emission. The variations in the fields are detected by the receiver means.

The detected variations are typically recorded by tape recorder. The recorder includes a playback feature so that the same device can be employed for deriving control signals in response to motion of the scriber, and for controlling the motion of a point source of optical energy that is projected as a visual image onto the writing surface to reproduce the motion of the stylus and enables a student to learn formation of alpha-numeric and other characters. The tape recorder may be included within the main housing or a common commercial two-track cassette or playback recorder may be used with conventional plug in connecting wires.

For readout, i.e., to teach the student to form alpha-numeric and other characters, the output signals of the recorder through an amplifier, drive the motor means which control the position of the beam from the light source; said beam is swept across a surface of a plate having an upper surface that forms the writing surface. The plate includes phosphors responsive to the swept optical beam so that a controllable visible image is derived from the writing surface. The writing surface is preferably a flat face over which the scriber can be readily moved, and onto which a translucent sheet of tracing paper can be placed. The phosphors have a response time such that each point on the writing face from which illumination is derived in response to the swept optical beam continues to provide illumination after the energy no longer impinges on the point. However, the phosphors are not so dense that the visual image continues for more than a second or so after the beam has moved across the particular point. Thereby, the light emitting points do not appear to move so rapidly that the student cannot follow them, but quenching of the phosphors does occur rather rapidly so that the student has the impression of a moving light source and is enabled to follow the moving light to form the character as desired.

Because the same apparatus can be utilized as an input and output device, the cost of the present device is relatively low. It is to be understood, however, that in certain instances, the tape recorder can be eliminated and a single input device can be connected to multiple output devices via a suitable communications link. Alternatively, machines commonly called dual track cassette recorder-players are suitable devices to utilize with this apparatus. When cassette players are utilized, an individual may select a previously prepared casette type and play it (via an adapter plug assembly) into the apparatus which in turn will produce the desired visual images.

The above and still further objects, features and advantages of the present invention will become apparent upon consideration of the following detailed description of one specific embodiment thereof, especially when taken in conjunction with the accompanying drawing.

DETAILED DESCRIPTION OF THE INVENTION

Figure 1:
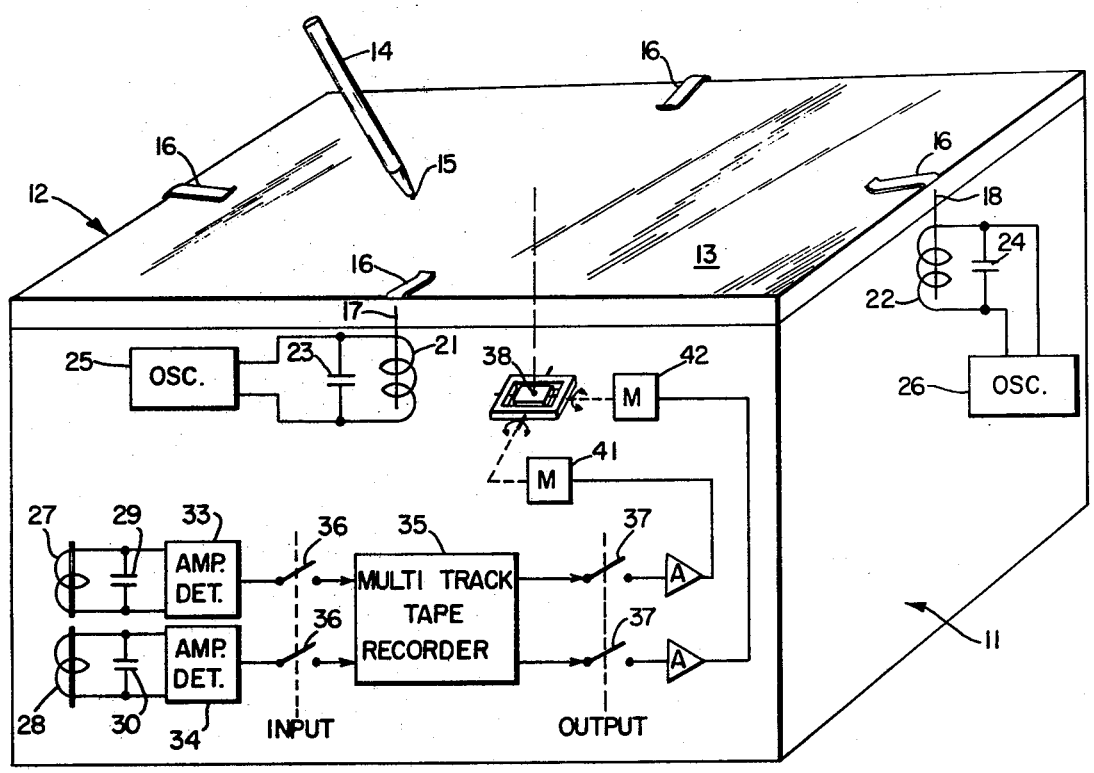
FIG. 1 is a perspective and partially schematic diagram of an apparatus in accordance with the present invention.
Figure 2:
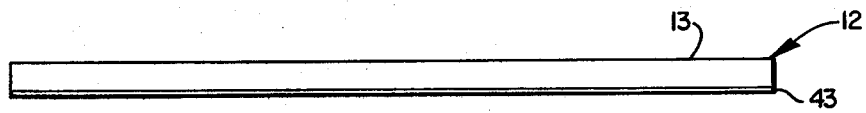
FIG. 2 is a side view of a dielectric plate that can be utilized in the apparatus of FIG. 1.

Reference is now made to FIG. 1 of the drawing wherein there is illustrated a h using 11 having an upper dielectric translucent plate 2, made for example of glass or an acryliclike substance, having an outer flat, writing face 13 over which scriber 14 can be moved. Scriber 14 has a metallic tip 15 and thereby can be a common ball point pen or other similar implement. Plate 12 is generally horizontally disposed, but may be tilted with respect to the horizontal to make it easier to write on flat surface 13. To enable a sheet of translucent, tracing paper to be held in place on face 13, a plurality of dielectric spring fingers 16 project inwardly from the central portion of each of the edges of plate 12 along face 13.

Orthogonally oriented electromagnetic fields having differing oscillating frequencies, are respectively coupled to plate 12 by antennas 17 and 18. For illustrative purpose in the drawing, antenna 17 is centrally located along the front edge of plate 12, while antenna 18 is centrally located along the right, side edge of the plate. Antennas 17 and 18 are electronically coupled to coils 21 and 22. Coils 21 and 22 are respectively connected in shunt with capacitors 23 and 24 to form relatively high Q tuned output circuits for oscillators 25 and 26, respectively. The circuit including coils 21 and capacitor 23 causes oscillator 25 to oscillate at a predetermined frequency $F_1$, e.g., $F_1 = 27.250$ MHz, while coil 22 and capacitor 24 cause oscillator 26 to oscillate at a different predetermined frequency $F_2$, e.g., $F_2 = 27.750$ MHz. In one preferred embodiment, each of antennas 17 and 18 is coupled to a magnetic core which extends into coils 21 and 22. Antennas 17 and 18 are electromagnetic field radiators for the 27.250 MHz and 27.750 MHz electric wave outputs of oscillators 25 and 26 and cause the electromagnetic fields to radiate over the entire area of plate 12 and within the volume of housing 11.

As scriber 14 is moved over face 13 of plate 12, metal tip 15 perturbs the electromagnetic field derived from antennas 17 and 18. As metal tip 15 gets closer to the radiated antinodes of 17 and 18, there is a greater perturbation of the fields derived from the antennas. Metal tip 15 is inductively coupled to antennas 17 and 18 to load the tuned circuits coupled to the antennas 17 and 18 and thus change the generated signal characteristics of the circuits associated with coils 21 and 22 and their respective propagation. Because plate 12 does not essentially perturb the electromagnetic fields which are perturbed by tip 15, there is a unique, repeatable relationship between the variants of the outputs of oscillators 25 and 26 for each position of tip 15 on face 13. As tip 15 moves closer to the emitted antinode of antenna 17 there is a correlative change in the characteristics of the 27.250 MHz output of oscillator 25; similarly, as tip 15 moves closer to the antinode of antenna 18, there is a correlative change in the characteristics of the 27.750 MHz output of oscillator 26.

The motion of scriber 14 is detected by discerning the changes of the electromgnetic fields derived from antennas 17 and 18. To this end, a pair of ferrite core antenna loops 27 and 28 are provided in housing 11. Loops 27 and 28 are tuned by capacitors 29 and 30 to the frequencies $F_1$ and $F_2$ respectively derived from antennas 17 and 18. There is no particular criticality with regard to the position or orientation of coils 27 and 28 in housing 11, as long as they are able to respond to the radiated fields derived from antennas 17 and 18 and derive an output signal that is a replica of the field variations. Coils 27 and 28 have a sufficiently high Q so that the voltages derived across tuning capacitors 29 and 30 are respectively responsive to the frequencies derived from antennas 17 and 18; i.e., the tuned circuit of receiver 33 is responsive to the transmitter frequency emitted from antenna 17, but not responsive to the frequency emitted from antenna 18, and vice versa with regard to receiver 34.

The changes in the electromagnetic fields at frequencies $F_1$ and $F_2$ are detected by connecting the electrodes of capacitors 29 and 30 to the inputs of detectors 33 and 34, respectively. Detectors 33 and 34 and appropriate amplification A, thereby provide voltage changes commensurate with the motion of scriber 14 along face 13. The varying output voltages of detectors 33 and 34 are rectified and amplified to control the motion of a light source used to generate a light spot emitted from phosphors of plate 13 in order to visibly replicate the movement of scriber 14.

The output signals of detectors 33 and 34 can be simultaneously supplied via a communication link from an instructor station that comprises housing 11 to several student stations or the signals can be supplied to a multi-track tape recorder 35. In the former case, each of many students is provided with his own station comprising housing 11 and all can be simultaneously instructed as to the manner in which alpha-numeric and other similar characters are formed. As the instructor moves his scriber over face 13, the motion of the scriber is reproduced at each of the student stations and each student follows the light image by tracing on the tracing paper resting on face 13. In the latter case, signals are supplied by detectors 33 and 34 through normally open switches 36 (which are closed while the recorder is responsive to motion of scriber 14) to a pair of heads in a multi-track tape recorder 35 and the students can subsequently learn formation of alpha-numeric and other similar characters at a later time by using a multi-track cassette player or similar apparatus in conjunction with the pre-recorded tape and apparatus of housing 11. In the future description, it is assumed that a two-track tape recorder 35 is employed to control the motion of the emitted light beam spot in accordance with the movements of metal tip of scriber 14.

When the device is utilized to teach a student the preferred manner of forming alpha-numeric and other similar characters, the previously recorded tape is played back by recorder 35 and supplied through switches 37 (which are closed while the recorder is in a playback mode) to control the motion of point optical energy source 38 that is contained in housing 11 and is centrally located beneath plate 12. Where external cassette recorder-player, or similar devices, are used, they are connected to apparatus housing 11 by conventional means in keeping with the state of the art. For example: quick connect and disconnect plugs and line wire to receptacles provided in housing 11 and respective recording-playback unit. Source 38 is a high intensity light bulb having a narrow beam, on the order of ¼ inch in diameter, and a condensing lens so that a spot having approximately a ¼ inch diameter is projected onto the under side of plate 12. The position where the beam from source 38 is projected to the under side of plate 12 is controlled by the two output signals of recorder 35, which are coupled through switches 37 to power amplifiers A to energize motors 41 and 42. Motor 42 causes source 38 to rotate in a plane parallel to the sidewalls of housing 11; if zero voltage is supplied to motor 41, source 38 rotates in a plane halfway between the sidewalls in response to the input to motor 42. In contrast, motor 41 causes source 38 to rotate in a plane parallel to the front and rear walls of the housing; if zero voltage is supplied to motor 42, source 38 rotates in a plane halfway between the front and rear walls in response to the input to motor 41. Optical source 38 is thereby rotated in two orthogonally oriented planes to reproduce by means of a light spot at plate 12 the motion of scriber 14, as recorded in the two tracks of recorder 35.

To provide a moving light trace on face 13, which can readily be copied by a student who has placed translucent tracing paper on face 13 and secured the paper in situ with fingers 16, plate 12 provides a persistence of light from the beam projected by source 38 on the lower face of the plate. It has been found that the projected, optical energy spot appears to move too quickly across face 13 to enable it to be easily followed by a student if some persistence of light is not provided. On the other hand, if the persistence of light is excessively long, the spot on face 13 does not appear to move and the student may form a character incorrectly after it has been completely replicated onto the face 13. Therefore, it is desired for plate 12 to have a persistence of illumination of approximately 1 to 2 seconds, but may be varied to meet differing needs.

To these ends, lower face of plate 12 is provided with a phosphor coating 43. The portion of phosphor coating 43 which is illuminated by the beam from source 38 immediately causes light to be emitted from a corresponding portion of upper face 13. Luminescence of phosphor coating 43 is quenched in approximately 1 or 2 seconds and is thereafter extinguished. Instead of using a phosphor coating 43, plate 12 can be impregnated with a phosphor having the required decay times.

Figure 3:
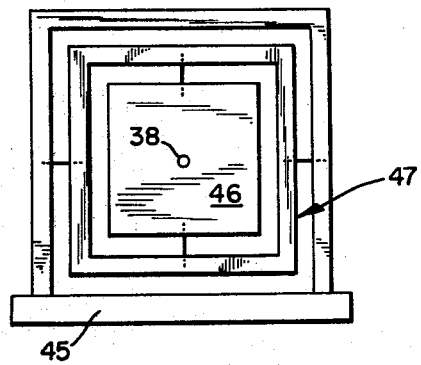
FIG. 3 is a front view of an apparatus on which a light source in the device of FIG. 1 is mounted.

Reference is now made to FIG. 3 of the drawing wherein there is illustrated a preferred embodiment for a rotatable carriage assembly supported in a fixed retaining frame 45. Carriage assembly 45 includes an interior slab 46 on which light source 38 is mounted so that when the carriage is in a neutral position, i.e., pointing directly upward toward the center of plate 12, the optical beam axis of source 38 is at right angles to the plane of slab 46 and plate 12. Surrounding slab 46 is a frame 47 having a hollow central portion into which slab 46 fits. Frame 47 is rotatably mounted on a fixed retaining frame 45, relative to a fixed wall of housing 11, while slab 46 is rotatably mounted within frame 47 so that the slab rotates at right angles to the frame 47.

Frame 47 is driven by motor 42 to rotate frame 47 in the central plane parallel to the sidewalls of housing 11. Slab 46 is driven by motor 41 to rotate slab 46 in the central plane parallel to the front and rear walls of housing 11. As the signal variations (recorded from detectors 33 and 34 onto their respective tracks on the recording tape) are played, these same variations control the movement of light source 38 by controlling voltage changes to motors 41 and 42 through appropriate amplifiers A so that movement of the light spot from the light source 38 is commensurate with the motion of scriber 14. Alternatively, the variations from detectors 33 and 34 may be fed, by bypassing the tape recorder, to control the movement of light source 38.

While there has been described and illustrated one specific embodiment of the invention, it will be clear that variations in the details of the embodiment specifically illustrated and described may be made without departing from the true spirit and scope of the invention as defined in the appended claims. For example, while the antennas 17 and 18 are the preferable forms of the radiators for the electric energy derived from oscillators 25 and 26, it is to be understood that other types of transmitters, receivers and antennas can be utilized. For example, the antennas can be in the form of a pair of crossed wires that extend at right angles to each other and are insulated from each other; the wires extend between opposite edges of plate 12. Alternatively, the antenna can be in the form of two sets of parallel wires, wherein one set of parallel wires runs along one pair of parallel edges of plate 12, while the other set of parallel wires run along the edges of the plate which are at right angles to the first named pair. Further, only two, mutually orthogonal wires running along mutually orthogonal edges of plate 12 can be employed.

What is claimed is:

1. Apparatus for enabling the motion of a scriber to be reproduced comprising a body having a writing surface on which the scriber is adapted to be moved, radiator means coupled to the body, oscillator means for driving said radiator means so that the radiator emits waves that are replicas of waves derived by the oscillator means, receiver means for receiving waves transmitted by said radiator means, said body being formed of a material that does not perturb a characteristic of the transmitted and received waves, the scriber being formed of a material that perturbs the characteristic of the waves received by said receiver means, said radiator means being excited by the oscillator means and cooperating with the receiver means and scriber so that there is a unique relationship between each position of the scriber on the surface and the value of the characteristic received by said receiver means.

2. The apparatus of claim 1 wherein the oscillator means and radiator means establish first and second RF fields respectively having first and second frequencies, the receiver means including means for separately detecting the characteristic at the first and second frequencies, the field of the first frequency having a configuration so that the value of the characteristic of the first frequency is indicative of the scriber position relative to a first axis of the surface, the field of the second frequency having a configuration so that the value of the characteristic of the second frequency is indicative of the scriber position relative to a second axis of the surface, the first and second axes being at right angles to each other.

3. The apparatus of claim 2 wherein the fields are derived from electric wave sources and the scriber includes a metal segment for perturbing waves derived from the sources.

4. The apparatus of claim 2 wherein the oscillator means includes a pair of relatively high Q circuits coupled to the radiator means, one of said circuits being included for each frequency, said scriber including a metal portion that is inductively coupled to the radiator means as the scriber is moved across the writing surface, whereby the characteristics of the emissions of the circuits and their radiated fields are changed as the position of the scriber changes in said fields, said receiver means including means for separately detecting the changes in the fields.

5. The apparatus of claim 1 wherein the oscillator means includes a relatively high Q circuit coupled to the radiator means and said scriber includes a metal portion that is inductively coupled to the radiator means as the scriber is moved across the writing surface, whereby, the characteristics of the emitted waves are changed and subsequently received and detected by receiver means including means for detecting the changes in the received waves.

6. Apparatus for reproducing the motion of a scriber in response to a pair of electric signals indicative of the scriber motion in two coordinate directions comprising a point source of optical energy, a plate positioned to be irradiated by a beam of optical energy from the source, motor means responsive to the signals for controlling the position of the source so that the beam is swept across a surface of the plate to reproduce the scriber motion, said plate including a flat reading surface adapted to receive a sheet of translucent tracing paper and phosphors responsive to the swept beam so that a visible image of the swept beam is derived from the reading face, said phorphors being such that each point on the reading face which provides illumination in response to the swept beam continues to provide illumination after the beam no longer impinges on the point, the continuing illumination occurring for a long enough period to enable a user to perceive the results of the motion of the scriber.

7. The apparatus of claim 6 wherein the apparatus can be utilized for deriving the pair of electrical signals, the reading surface being smooth and flat so that the scriber can be moved across it and it can be used as a writing surface, the reading surface being part of a dielectric plate, further including electric radiator means coupled to the dielectric plate, transmitter means for driving said radiator means, receiver means for receiving waves transmitted by said radiator means, said plate being formed of a dielectric material that does not essentially perturb characteristics of the transmitted and received waves, the scriber being formed of a material that perturbs the characteristic of the waves received by said receiver means, said radiator means being excited by the transmitter means so that there is a unique relationship between each position of the scriber on the surface and the value of the characteristics of the waves received by said receiver means.

8. Apparatus particularly adapted to teach students to write alpha-numeric and other similar types of characters comprising a housing having an upper generally horizontally disposed, dielectric, translucent plate having an outer, flat face over which a scriber can be moved and which is adapted to receive a sheet of translucent paper, means for coupling orthogonally oriented electromagnetic fields having differing frequencies to the plate, said means for coupling including transmitter circuits, the functional characteristics of the transmitter circuits being changed in response to movements of a metal tip of the scriber so that the form of the orthogonal fields depend on the scriber movement, receiver means for the electromagnetic fields for separately detecting the variations of the fields, a magnetic recorder for recording the detected variations, said recorder including playback means for deriving signals representing the detected variations, a point source of optical energy for projecting a beam of optical energy onto the plate to form a projected optical energy image, motor means responsive to the playback means for controlling the movement of the point source relative to the plate to form an optical energy replica of the movement of the scriber on the plate, said plate including phosphors responsive to the optical energy to provide a visual image with persistence of luminescence for the projected optical energy image on the outer face, said phosphors having a decay time to enable a pattern of the light source to appear to move and to provide sufficient persistence of light to enable a student to trace the pattern, said electromagnetic field coupling means, circuit means, receiver means, recorder, motor means and optical source being located within said housing.

9. The apparatus of claim 8 wherein, said recorder is of conventional, readily available, commercial multitrack design with the capability of being coupled to the housing through conventional plug and wire connectors.

10. Apparatus particularly adapted to teach students to write alpha-numeric and other similar types of characters comprising a housing having an upper generally horizontally disposed translucent plate having an outer, flat face over which a scriber can be moved and which is adapted to receive a sheet of translucent paper, radiator means coupled to the plate, oscillator means for driving said radiator means so that the radiator means emits waves that are replicas of waves derived by the oscillator means, receiver means for receiving waves transmitted by said radiator means, said plate being formed of a dielectric material that does not essentially perturb a characteristic of the transmitted and received waves, the scriber being formed of a material that perturbs the characteristic of the waves received by said receiver means, said radiator means being excited by the transmitter means and cooperating with the receiver means and scriber so that there is a unique relationship between each position of the scriber on the face and the value of the characteristics of waves received by said receiver means, said receiver means including means for detecting the characteristic of the receiver waves, a magnetic recorder for recording the detected characteristics, said recorder including playback means for deriving signals representing the detected characteristics, a point source of optical energy for projecting a beam of optical energy onto the plate to form a projected optical energy image, motor means responsive to the playback means for controlling the movement of the point source relative to the plate to form an optical energy replica of the movement of the scriber on the plate, said plate including phosphors responsive to the optical energy to provide a visible image with persistence of light for the projected optical energy image on the outer face, said phosphors having a decay time to enable a pattern of the light source to appear to move and to provide sufficient persistence of light to enable a student to trace the pattern, said electromagnetic field coupling means, circuit means, receiver means, switching means, motor means and optical source being located within said housing.

* * * * *